May 15, 1945.　　　F. F. DAUENHAUER　　　2,376,128
POCKET TROMMEL
Filed Dec. 22, 1941　　　2 Sheets-Sheet 1

INVENTOR.
FLORIAN F. DAUENHAUER
BY Munn, Liddy, Glaccum & Kane
ATTORNEYS

May 15, 1945.  F. F. DAUENHAUER  2,376,128
POCKET TROMMEL
Filed Dec. 22, 1941  2 Sheets-Sheet 2

INVENTOR.
FLORIAN F. DAUENHAUER
BY Munn, Liddy, Slocum & Kane
ATTORNEYS

Patented May 15, 1945

2,376,128

UNITED STATES PATENT OFFICE 2,376,128

POCKET TROMMEL

Florian F. Dauenhauer, Santa Rosa, Calif.

Application December 22, 1941, Serial No. 423,938

5 Claims. (Cl. 209—308)

The present invention relates to improvements in a pocket trommel and it consists of the combinations, constructions and arrangements hereinafter described and claimed.

An object of my invention is to provide a pocket trommel especially designed for cleaning the hops that have been separated from the vines by the hop picking machine shown in my copending application, Serial No. 422,049, filed December 8, 1941. In the copending case the hop vines are attached to an endless conveyor and are moved past hop picking drums where the hops are removed from the vines. The hops drop upon a conveyer and this conveyer carries the hops to my pocket trommel. The hops have to be cleaned and the pocket trommel comprises a machine which performs the first cleaning operation after the hops leave the picking machine. The pocket trommel can be used for cleaning other material.

The pocket trommel is designed especially to remove branches that have broken from the vines in the picking machine and are still attached to the hops, as well as to remove stems, large leaves and clusters. Novel means is provided for tumbling the hops over a screen for separating the hops from the other matter by the tumbling action, the screen permitting the cleaned hops to pass therethrough while preventing the leaves, etc. from sifting through. The act of separating the hops from the foreign material is accomplished by passing the hops only once through the screen.

The device is simple in construction and the screen is so mounted as to form a pocket in one portion where the hops are tumbled, and the mounting means performs an additional function and causes the pocket in the screen to be agitated and to tumble the hops.

Other objects and advantages will appear in the following specification, and the novel features of the device will be particularly pointed out in the appended claims.

My invention is illustrated in the accompanying drawings forming a part of this application, in which.

While I have shown only the preferred form of my invention, it should be understood that various changes or modifications may be made within the scope of the appended claims without departing from the spirit of the invention.

In carrying out my invention I will first describer the frame, then the endless screen and drums, and finally the shaker.

Frame

I provide a frame, indicated generally at A, and this frame has a U-shaped arm 1 pivoted thereto at 2. The arm 1 is held in adjusted position by tension cables, each being indicated generally at 3. Each cable is attached to the frame A at 4 and to the arm 1 at 5. A turn-buckle 6 is placed in each tension cable 3 to take up any slack and to adjust the angle which the arm 1 makes with the horizontal top of the frame.

Endless screen and supporting drums

Figure 2:
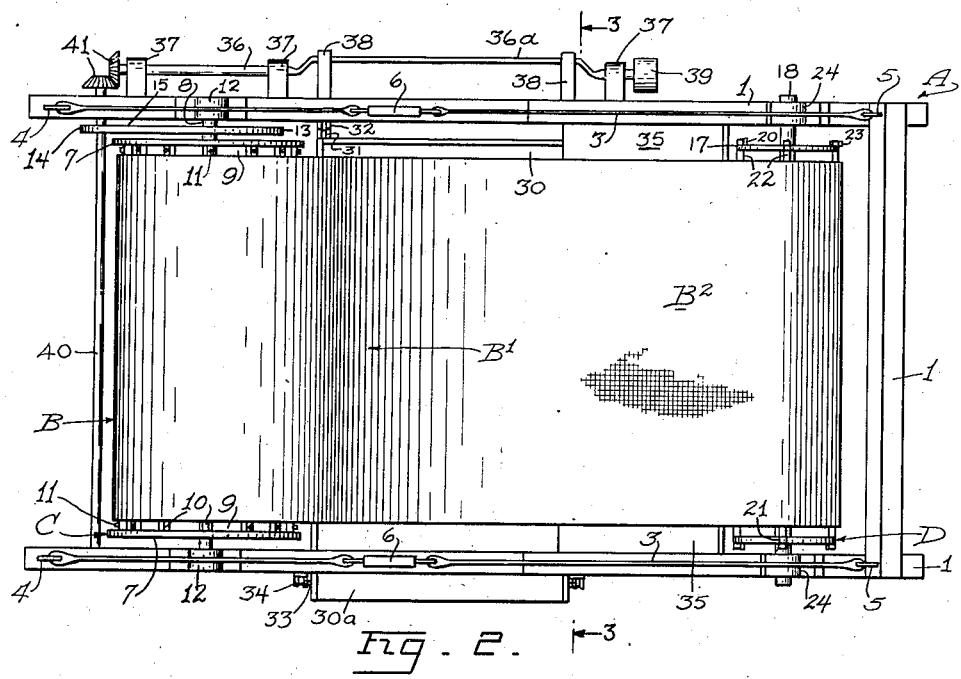
Figure 2 is a top plan view of the device.

The frame and arm carry an endless screen conveyer indicated generally at B. In the present machine the conveyer is six feet wide and has a one and three-quarters inch mesh therein, although I do not wish to be confined to any exact measurements for the screen or mesh. Figure 2 illustrates the mesh as being a plurality of squares large enough to permit hops to pass therethrough. In actual practice the mesh may be in the form of a plurality of diamonds or diagonally disposed squares covering the entire screen. The screen belt conveyer B is a chain belt and the mesh in the belt is formed from chain links. The belt B is passed around a driving pulley or drum, indicated generally at C, an idler or shaker pulley, indicated generally at D, and a return idler pulley, indicated generally at E. The drums C and E are rotatably mounted on the frame A while the drum D is rotatably mounted on the arm 1. I will describe the particular construction of the drums in the order they are given.

Figure 3:
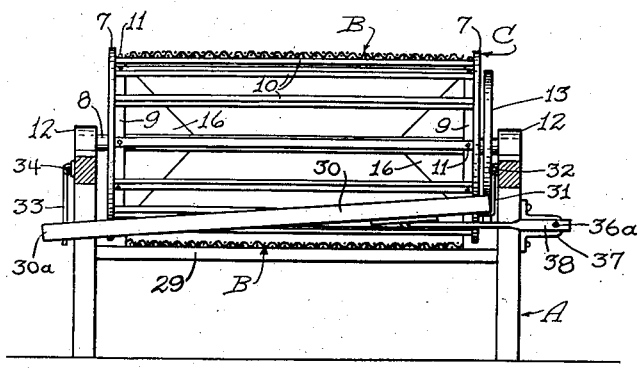
Figure 3 is a transverse section taken substantially along the line 3—3 of Figure 2.

The driving pulley or drum C has end discs 7, see Figure 3, which are mounted on an axle 8. The discs have circular bands 9 spaced inwardly from the disc peripheries, and these bands act as supports for the ends of the bars 10. The bars rest on the circular bands and are secured thereto by bolts 11. The bars are arranged close enough together to form a substantially cylindrical portion for the drum. The belt or screen B extends around the drum and rests on the bars 10, as shown in Figure 3. The ends of the axle 8 are rotatably mounted in bearings 12 which in turn are secured to the frame A. A sprocket 13 is secured to the axle and is connected to a drive sprocket 14, see Figure 1, by a sprocket chain 15. The discs 7 are reinforced by webs or flanges 16 that extend from the inner sides of the discs down to the axle 8.

Figures 4, 5:
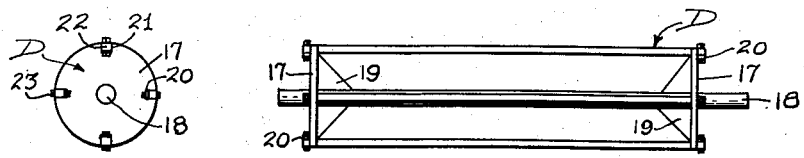
Figure 4 is an end view of the idler and shaker pulley.
Figure 5 is a side elevation of Figure 4.

The idler and shaker drum D is illustrated in Figures 4 and 5. The drum has metal end discs 17 mounted on an axle 18 and reinforced by webs or flanges 19 which extend from the discs to the axle. The discs 17 have portions 20 cut out of the periphery, and these portions are bent outwardly at right angles to the planes of the discs as illustrated. The outwardly bent portions leave recesses 21 in the disc peripheries, and the recesses in one disc are aligned with those in the other. Bars 22 extend between the discs and have their ends received in the recesses and resting on the flanges 19. Bolts 23 secure the bars to the flanges. Only four bars 22 are used in the idler and shaker drum and these are spaced 90° apart. The purpose of spacing the bars 90° apart is to agitate the conveyer or screen B as it passes around the drum. This agitation of the screen conveyer will be explained more in detail later. The axle 18 is received in bearings 24 which are mounted on the arm 1 as disclosed in Figures 1 and 2.

Figure 1:
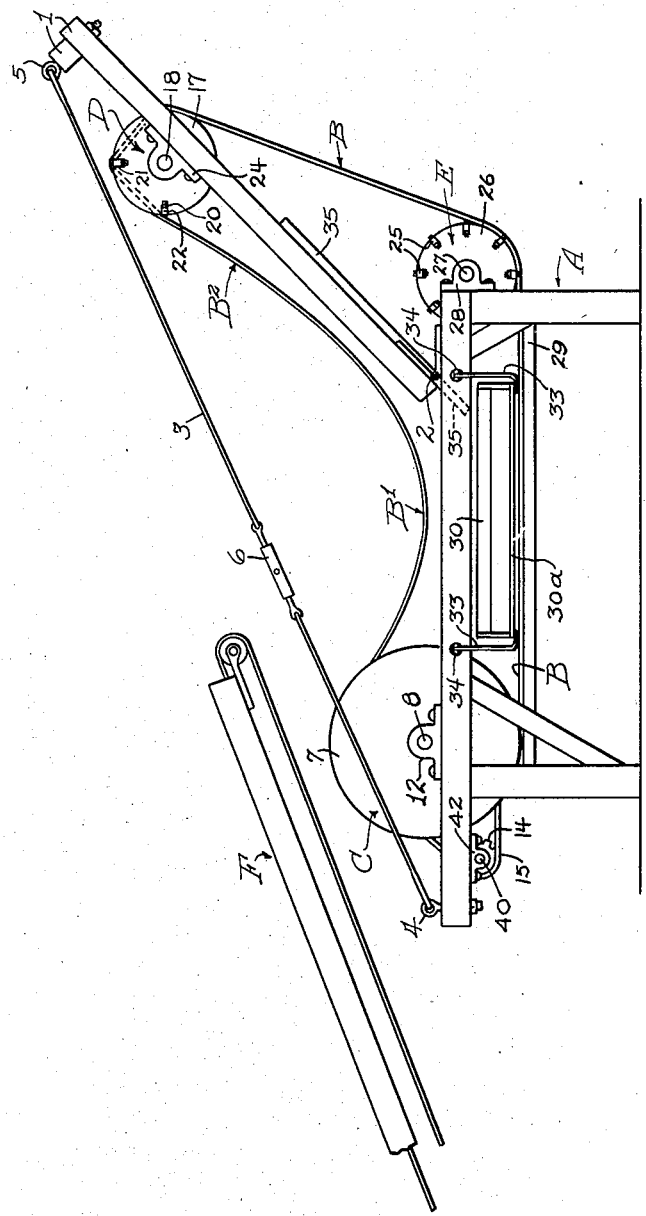
Figure 1 is a side elevation of the device.

The return idler drum E is of somewhat the same construction as the drum D except that it has more rods therein in order to form a more perfect cylinder. Figure 1 illustrates the drum E as having eight longitudinally extending rods 25 although the number may be changed at will. The rods or bars 25 are carried by the drum ends 26 which in turn are mounted on the axle 27 and the ends of the axle are received in bearings 28. The bearings are secured to the frame A.

The drums C and E are not for the purpose of agitating the screen but merely for moving the screen. The drum D is for the double purpose of moving the screen and of agitating it. Sufficient slack is provided in the screen conveyer to form a pocket, indicated generally at B1 in Figure 1. The pocket B1 is formed between the drums C and D and since the drum D is higher than the drum C, an upwardly inclined screen portion B2 extends from the pocket to the shaker drum D. In order to maintain the pocket B1 in the upper portion only of the conveyer screen, I provide a platform or floor 29 that is secured to the frame A and forms a part thereof. The portion of the screen extending between the drums C and E rides on the platform and the platform prevents any sag in this portion. The floor 29 in preventing a sag in the lower portion of the screen causes the sag or pocket to be maintained continuously in the upper screen portion even though the screen is continuously moved by the drums.

*Shaker conveyer*

Between the upper and lower portions of the screen I dispose a shaker conveyer 30 which extends from side to side of the machine and is slightly inclined, as shown in Figure 3, so that its outer end 30a projects beyond the side of the frame. The shaker is supported in hangers at both its ends and the hangers permit the shaker to be reciprocated. I provide a pair of hangers 31 at the upper end of the shaker and these are pivoted to the frame A at 32. The lower end of the shaker 30 is supported by a pair of hangers 33 that are pivoted to the frame at 34. Figure 3 clearly shows the shaker disposed above the lower portion of the screen and as being large enough to receive hops that drop through the pocket B1 formed in the upper portion of the screen. The shaker is trough-like in shape and its lower end 30a is open. A deflector board 35 carried by the U-shaped arm 1, see Figure 1, extends under the inclined portion B2 of the screen and receives any hops or other material that may pass through the upwardly inclined portion of the screen. The lower end of the board terminates above the shaker conveyer 30 and therefore the hops will be delivered into the shaker.

The means for reciprocating the shaker is disclosed in Figures 2 and 3. A crank shaft 36 is rotatably mounted in bearings 37, see Figure 2, which in turn are carried by the frame A, and the offset portion 36a of the crank shaft is connected by pitmans 38 to the shaker conveyer 30. A drive pulley 39 is connectible to a source of power (not shown) by a belt (not shown) and the pulley rotates the crank which in turn reciprocates the shaker conveyer. The hangers 31 and 33 permit the shaker to be reciprocated.

The same means that reciprocates the shaker also moves and agitates the screen conveyer B. Figure 1 shows the crank shaft 36 connected to a counter-shaft 40 by bevel gears 41. The counter-shaft 40 is supported by bearings 42 that in turn are secured to the frame A. The counter-shaft carries the sprocket 14 which is connected to the driving drum C by the sprocket chain 15 and sprocket 13. A rotation of the crank shaft 36 will cause the shaker 30 to reciprocate and will move the screen conveyor around the various drums C, D and E.

*Operation*

From the foregoing description of the various parts of the device, the operation thereof may be readily understood.

An elevator is indicated generally at F in Figure 1 and conveys hops from the hop picking machine (not shown) to the pocket trommel and delivers the hops into the pocket B1 of the trommel. The screen B is in constant motion and the pocket B1 will remain above the shaker 30 even though the screen is in motion. The bars 22 of the drum D agitate the inclined portion B2 of the screen as the drum revolves, and this agitation is carried down into the pocket B1 so that the pocket is also agitated. The agitation tends to separate the foreign material from the hops. The foreign material might be broken branches from the hop vines, stems, large leaves, etc. Most of this material is larger than the mesh in the screen and therefore will not pass through the screen. The hops however will pass through the screen and drop upon the shaker conveyer. The screen tends to convey the material from the pocket up the inclined portion B2 and if any hops moving up this inclined portion are still attached to stems or other vine portions which will prevent the hops from dropping through the screen and into the shaker conveyer, the weight of the hops will cause them to tumble back down the inclined portion and enter the pocket again. This tumbling action tends to free the loose hops from the leaves, stems, and branches with the result that the freed hops will pass through the screen. Some of the hops may pass through the inclined portion B2 of the screen, and should this take place these hops will strike the deflector board 35 and gravitate down into the shaker 30. The lighter stems and leaves will be carried up over the inclined portion and around the drum D where they will be expelled from the machine. The inclined screen portion between the drums D and E will not interfere with the foreign material falling free of the screen.

The hops that are received in the shaker are reciprocated so that the entire width of the shaker will be filled to a uniform depth with the hops. The shaker delivers the cleaned hops to one side of the machine and feeds them at a uniform depth to a leaf separator (not shown). The screen conveyer B acts as a strainer for the material being sorted and the shaker conveyer acts as a means disposed between the upper and lower portions of the screen conveyer for removing the strained material from the machine. The material passes through the screen conveyer only once during the cleaning operation.

I claim:

1. A pocket trommel comprising three drums rotating on horizontal axes, one of the drums being placed at a higher elevation than the other two, an endless screen conveyer passed around the drums and having a length longer than necessary to extend around the drums, said screen having upper and lower portions, the upper screen portion overlying the higher placed drum, means for supporting the lower screen portion providing slack in the upper portion for forming a material-receiving pocket in the upper portion that is only supported by the higher drum and one of the lower drums, and means for rotating at least one drum for moving the screen for agitating the material in the pocket and causing certain sized material to pass through the screen.

2. A pocket trommel comprising: a driving drum and an idler drum rotatable about horizontal axes, an endless screen having a lower portion extending across the undersides of the drums, a platform positioned between the drums for supporting the lower screen portion from the underside and in a straight line between the drums, an elevated drum placed above and slightly beyond the idler drum, said screen passing over the elevated drum and having sufficient length to have slack therein, the positive support given to the lower screen portion causing the slack to appear only in the upper screen portion and to form a material receiving pocket adjacent to the driving drum and of a predetermined size and capacity at all times whether the pocket is empty or is carrying different quantities of material, the screen having an upwardly inclined portion extending from the pocket and over the top of the elevated drum to carry oversized pieces out of the pocket, and an inclined conveyor disposed between the upper and lower screen portions for receiving screened material passing through the pocket and for delivering the screened material laterally to the side of the trommel, the inclined screen portion tumbling certain of the material back into the pocket for further screening.

3. A pocket trommel comprising: a driving drum and an idler drum rotatable about horizontal axes, an endless screen having a lower portion extending across the undersides of the drums, a platform positioned between the drums for supporting the lower screen portion from the underside and in a straight line between the drums, an elevated drum placed above and slightly beyond the idler drum, said screen passing over the elevated drum and having sufficient length to have slack therein, the positive support given to the lower screen portion causing the slack to appear only in the upper screen portion and to form a material receiving pocket adjacent to the driving drum and of a predetermined size and capacity at all times whether the pocket is empty or is carrying different quantities of material, the screen having an upwardly inclined portion extending from the pocket and over the top of the elevated drum to carry oversized pieces out of the pocket, and an inclined conveyor disposed between the upper and lower screen portions for receiving screened material passing through the pocket and for delivering the screened material laterally to the side of the trommel, the inclined screen portion tumbling certain of the material back into the pocket for further screening, and an inclined deflector board underlying the inclined screen portion for delivering any screened material dropping through the inclined portion, to the conveyor.

4. A pocket trommel comprising: a driving drum and an idler drum rotatable about horizontal axes, an endless screen having a lower portion extending across the undersides of the drums, a platform positioned between the drums for supporting the lower screen portion from the underside and in a straight line between the drums, an elevated drum placed above and slightly beyond the idler drum, said screen passing over the elevated drum and having sufficient length to have slack therein, the positive support given to the lower screen portion causing the slack to appear only in the upper screen portion and to form a material receiving pocket adjacent to the driving drum and of a predetermined size and capacity at all times whether the pocket is empty or is carrying different quantities of material, the screen having an upwardly inclined portion extending from the pocket and over the top of the elevated drum to carry oversized pieces out of the pocket, and an inclined conveyor disposed between the upper and lower screen portions for receiving screened material passing through the pocket and for delivering the screened material laterally to the side of the trommel, the inclined screen portion tumbling certain of the material back into the pocket for further screening, and an inclined deflector board underlying the inclined screen portion for delivering any screened material dropping through the inclined portion, to the conveyor; said elevated drum having a non-circular periphery for shaking the inclined screen portion and pocket to aid the screening operation, and means for reciprocating the inclined conveyor for aiding in moving all of the screened material to the side of the trommel.

5. A pocket trommel comprising a pair of drums having horizontal axes and constituting an initial power drum and a terminal idler drum at a higher elevation than the initial drum; an endless screen belt passed around the drums and having upper and lower portions, the length of the screen belt being sufficient to provide slack therein; means for maintaining slack in the upper screen belt portion at all times, whereby a material receiving pocket is provided with the belt portion from the initial power drum to the pocket extending downwardly and the belt portion from the pocket to the terminal idler drum extending upwardly at a steep angle; the mesh of the belt being of a size to permit hops received in the pocket to pass therethrough while the belt retains the stems and vines and carries them up the steep angled belt portion to the terminal drum where they are discharged; any hops that are still connected to stems, tumbling down the steep angled belt portion with sufficient force to sever the stems from hops.

FLORIAN F. DAUENHAUER.